United States Patent
Rodrigues-Morgado

(10) Patent No.: US 9,157,563 B2
(45) Date of Patent: Oct. 13, 2015

(54) BLEEDING SYSTEM

(71) Applicant: Airbus Operations SAS, Toulouse (FR)

(72) Inventor: Cédric Rodrigues-Morgado, Toulouse (FR)

(73) Assignee: Airbus Operations SAS (FR)

( * ) Notice: Subject to any disclaimer, the term of this patent is extended or adjusted under 35 U.S.C. 154(b) by 103 days.

(21) Appl. No.: 13/786,588

(22) Filed: Mar. 6, 2013

(65) Prior Publication Data

US 2013/0174918 A1    Jul. 11, 2013

Related U.S. Application Data

(63) Continuation of application No. PCT/FR2011/052025, filed on Sep. 5, 2011.

(30) Foreign Application Priority Data

Sep. 8, 2010   (FR) ..................................... 10 57118

(51) Int. Cl.
   | | |
   |---|---|
   | *F16L 27/093* | (2006.01) |
   | *F16L 41/00* | (2006.01) |
   | *B60T 17/22* | (2006.01) |
   | *F15B 21/04* | (2006.01) |
   | *F16L 55/07* | (2006.01) |

(52) U.S. Cl.
   CPC ............. *F16L 41/005* (2013.01); *B60T 17/222* (2013.01); *F15B 21/044* (2013.01); *F16L 27/093* (2013.01); *F16L 55/07* (2013.01); *Y10T 137/0402* (2015.04); *Y10T 137/6855* (2015.04)

(58) Field of Classification Search
   CPC ...... F16L 27/087; F16L 27/093; F16L 41/005
   USPC ............................. 285/127.1, 142.1, 190, 191
   See application file for complete search history.

(56) References Cited

U.S. PATENT DOCUMENTS

| | | | | |
|---|---|---|---|---|
| 386,881 | A | * | 7/1888 | Harris et al. ............... 285/147.1 |
| 712,738 | A | * | 11/1902 | Stevens ......................... 285/190 |
| 2,256,516 | A | | 9/1941 | Carlin |
| 2,400,658 | A | * | 5/1946 | Shepherd ...................... 285/190 |

(Continued)

FOREIGN PATENT DOCUMENTS

| | | |
|---|---|---|
| EP | 1122139 A1 | 8/2001 |
| FR | 2933763 A1 | 1/2010 |
| WO | 2010091896 A1 | 8/2010 |

*Primary Examiner* — James Hewitt
(74) *Attorney, Agent, or Firm* — Lerner, David, Littenberg, Krumholz & Mentlik, LLP

(57) ABSTRACT

A bleeding system includes an open conduit and, upstream, a control controlling the hydraulic fluid flow, toward the open conduit. The bleeding system includes a dismountable connection device including connection mechanism adapted to be connected to the bleeding system; an outlet adapted to be connected to a pipe; a first central portion including the connection mechanism, a cylindrical bearing, and a conduit extending from the connection mechanism up to the surface of the cylindrical bearing; and an annular second portion including a bore adapted to pivot on the cylindrical bearing, at least one conduit connecting the outlet and the surface of the bore. The first portion and/or the annular portion include a groove ensuring the hydraulic fluid flows between the conduits. The central portion includes a section arranged between the connection mechanism and the cylindrical bearing to ensure the connection of the connection device to the bleeding system.

7 Claims, 3 Drawing Sheets

(56) References Cited

U.S. PATENT DOCUMENTS

| | | | |
|---|---|---|---|
| 2,555,869 A * | 6/1951 | Bright | 285/148.2 |
| 3,125,360 A * | 3/1964 | Ulrich | 285/124.5 |
| 3,384,394 A * | 5/1968 | O'Connor | 285/190 |
| 3,610,348 A * | 10/1971 | Brooks et al. | 175/207 |
| 4,142,741 A * | 3/1979 | Fiala | 285/39 |
| 4,452,695 A * | 6/1984 | Schmidt | 210/167.05 |
| 4,626,006 A | 12/1986 | Noguchi et al. | |
| 4,672,998 A | 6/1987 | Kozak, III | |
| 4,679,829 A * | 7/1987 | Yanagisawa | 285/190 |
| 5,533,764 A * | 7/1996 | Williamson | 285/212 |
| 6,056,325 A * | 5/2000 | Bernard | 285/39 |
| 7,337,990 B2 * | 3/2008 | Kurosaka et al. | 239/587.2 |

\* cited by examiner

BLEEDING SYSTEM

CROSS-REFERENCE TO RELATED APPLICATIONS

The present application is a continuation of International Application No. PCT/FR2011/052025, filed Sep. 5, 2011, which claims priority from French Patent Application No. 10 57118, filed Sep. 8, 2010, the disclosures of which applications are hereby incorporated herein by reference.

BACKGROUND OF THE INVENTION

The present invention relates to a device for connecting to a bleeding system, more particularly to a bleed screw of an aircraft brake circuit.

During maintenance operations, the brake circuits of an aircraft must be tested. Certain portions of the circuit, particularly the brake fluid reservoirs (also referred to as tanks) must be bled.

The bleeding operation consists of evacuating air from the circuit.

To this end, the portions to be bled each comprise at least one bleeding system 10 to which a transparent flexible pipe 12 may be connected, as shown in FIG. 1.

Thus, the bleeding operation consists of connecting the pipe 12, opening the bleeding system 10, controlling the flow of the brake fluid in the pipe 12, and possible air bubbles, then closing the bleeding system 10 when the brake fluid circulating inside the pipe 12 no longer has air bubbles.

The flexible pipe 12 makes it possible to collect the brake fluid and, because it is transparent, to see if there are air bubbles.

To connect to the bleeding system, the pipe comprises, at one of the ends thereof, a rigid endpiece 14 comprising, on the one hand, a first cylindrical bearing 16 onto which the pipe 12 can be fitted, and, on the other hand, a threaded bore 18 (or a second threated cylindrical bearing) to be screwed into the bleeding system, the first cylindrical bearing 16 and the bore 18 (or the second cylindrical bearing) being connected by a conduit 20, substantially coaxial and fixed with respect to one another.

Because it is flexible, the pipe can snake between the different elements present in the environment of the bleeding system.

However, when the space perpendicular to the bleeding system is too limited, the pipe can bend and the flow section may be pinched perpendicularly to this fold. This pinching limits the flow of the brake fluid which tends to increase bleeding time and causes an emulsion of the brake liquid, thus making it more difficult to see if air bubbles are present in the brake fluid.

According to another constraint, it is necessary for the connection device to be tightened well so as to limit the risks of air bleed between the open conduit and the connection devices.

BRIEF SUMMARY OF THE INVENTION

Thus, an embodiment of the present invention provides a bleeding system comprising an open conduit and, upstream, a control allowing the hydraulic fluid to flow, or not, toward said open conduit, said control having a section that can be maneuvered with a given tool, said bleeding system comprising a dismountable connection device comprising:
  connection means adapted to be connected to the bleeding system;
  an outlet adapted to be connected to a conduit;
  a first central portion comprising said connection means, a cylindrical bearing, and a conduit extending from the connection means up to the surface of the cylindrical bearing;
  an annular second portion comprising a bore adapted to pivot on the cylindrical bearing, at least one conduit connecting the outlet and the surface of the bore, the central portion and/or the annular portion comprising a groove ensuring the hydraulic fluid flows between the conduits,
characterized in that the central portion of the connection device comprises a section to ensure the connection of said connection device to the bleeding system arranged between the connection means and the cylindrical bearing.

The connection device allows for the conduit to be oriented at 90° relative to the outlet of the bleeding system, which limits the risks of the conduit becoming pinched even in the case in which space is limited. In addition, since the annular portion can pivot with respect to the central portion, it is possible to orient the pipe toward an accessible and/or relatively empty zone.

BRIEF DESCRIPTION OF THE DRAWINGS

Other characteristics and advantages will become apparent from the description that follows, given only by way of example, with reference to the annexed drawings, wherein.

DETAILED DESCRIPTION

In order to be bled, a hydraulic circuit comprises at least one bleeding system referred to, hereinafter, as bleed screw 22.

By way of example, a bleed screw 22 is provided in the area of the hydraulic reservoir of an aircraft brake circuit. The invention is not limited to this application and can be suitable for other hydraulic circuits.

A bleed screw 22 comprises an open conduit 24 and, upstream, a control for allowing, or not, the hydraulic fluid to flow toward the open conduit. It also comprises connection means 26, a threaded bore, or a threaded cylindrical bearing, for example, coaxial to the open conduit 24.

The valve and the connection means are not described any further as they are known to one having ordinary skill in the art and can have different configurations.

To collect the hydraulic fluid during the bleeding operation, a bleed tool comprising a pipe 28 and a connection device to connect the pipe 28 to the bleed screw 22 can be used.

The pipe 28 is flexible and transparent. The pipe 28 is not described any further as it is known to one having ordinary skill in the art and other solutions could be envisioned to channel the hydraulic fluid escaping from the bleed screw.

The connection device comprises two portions.

Figure 4:
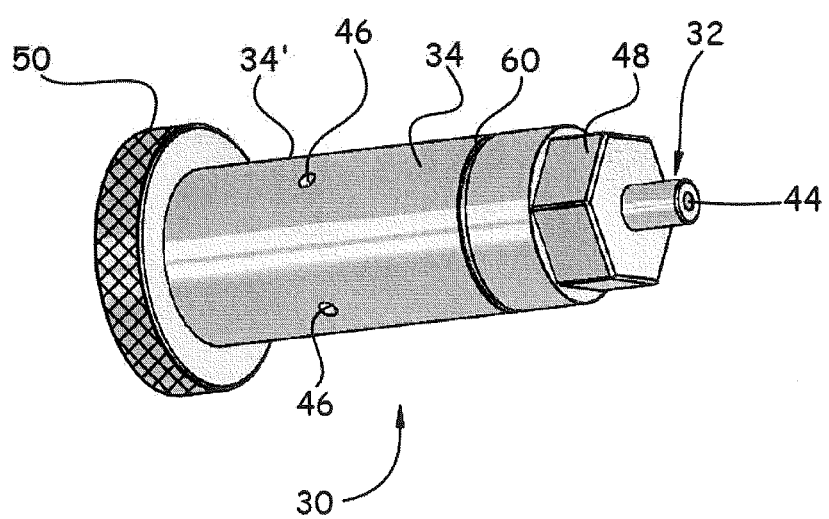
FIG. 4 is a perspective view of a first portion referred to as central portion of the connection device according to another embodiment of the invention.

The first portion, referred to as a central portion 30 (shown in FIG. 4), comprises connection means 32, a cylindrical bearing 34, at least one conduit 36 extending from the connection means 32 up to the area of the surface 34' of the cylindrical bearing 34 (this surface 34' corresponding to the outer surface of a portion of the central portion 30).

Figure 5:
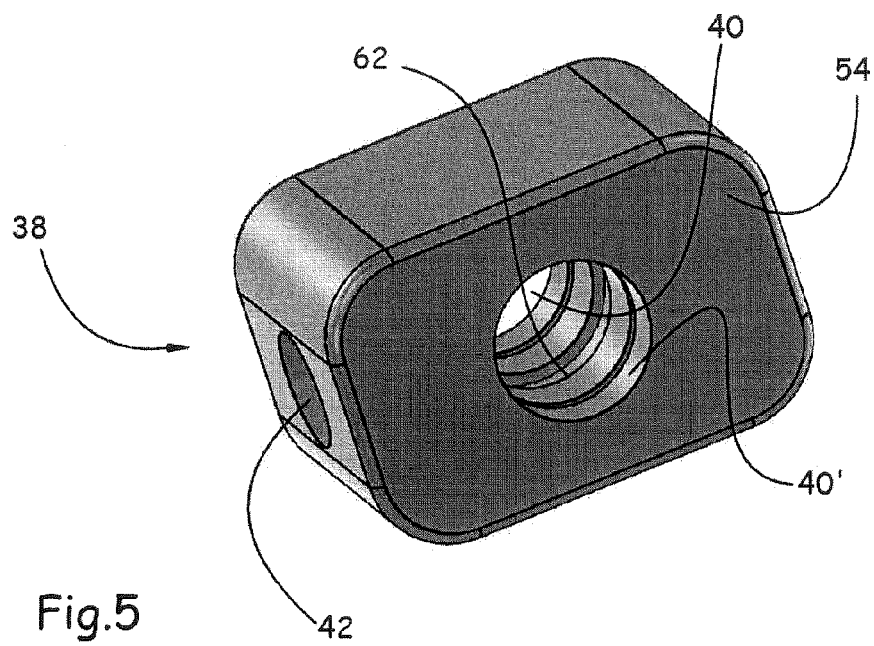
FIG. 5 is a perspective view of a second portion referred to as annular portion of the connection device according to another embodiment of the invention.

The second portion, referred to as an annular portion 38 (shown in FIG. 5), comprises a bore 40 adapted to pivot on the cylindrical bearing 34, an outlet in the area of the outer surface of the annular portion 38, and at least one conduit 42 connecting the outlet and the surface 40' of the bore 40 facing the cylindrical bearing 34, the central portion 30 and/or the annular portion 38 comprising a groove 62 for the hydraulic fluid to flow between the conduits 36 and 42 even if the conduits 36 and 40 are not aligned.

Preferably, the groove 62 extends over the entire periphery of the central portion 30 and/or of the annular portion 38 so as to ensure the hydraulic fluid flows regardless of the angular position relative to the annular portion 38 with respect to the central portion 30.

According to an embodiment, the central portion 30 is cylindrical with, at one end, means 32 of connection to the bleed screw 22 in the form of a threaded cylindrical portion (with a diameter that is less than that of the cylindrical bearing 34) cooperating with the connection means 26 of the bleed screw.

The conduit 36 comprises, on the one hand, a first section 44 coaxial to the cylindrical portion with connection means 32 and the cylindrical bearing 34, opening out in the area of the connection means 32, and on the other hand, several radial channels 46 which extend from the coaxial section 44 to the surface 34' of the cylindrical bearing 34.

Preferably, the central portion 30 comprises four radial channels 46 arranged in a plane perpendicular to the axis of the coaxial section 44, forming together 90° angles.

The central portion 30 further comprises maneuvering means to ensure the connection thereof to the bleed screw 22.

According to an embodiment, the central portion 30 comprises between the connection means 32 and the cylindrical bearing 34, an hexagonal section 48 of the same shape as the section for controlling the opening or the closing of the bleed screw 22. It comprises, in the area of its second end (opposite the connection means 32), a flange 50 with a knurled periphery.

The knurled flange 50 allows the connection means to be screwed manually, the section 48 allowing for a screwing by means of the same tool as that used to cause the opening or the closing of the bleed screw. The tightening by means of a tool using section 48 makes it possible, in a limited space, to efficiently tighten the connection means 32 in order to limit the risks of air intake between said connection means 32 and the connection means 26. In the opposite case, an air intake could hinder the bleeding operation.

According to an embodiment, the annular portion 38 comprises, at each end, flat surfaces perpendicular to the bore 40, a first surface 52 taking support against the flange 50, the second surface 54 taking support against a washer 56 and/or a circlip 58 immobilized along a direction parallel to the axis of the bore 40 in a groove 60 housed in the periphery of the central portion 30. Other means could be used to immobilize, along the longitudinal direction (coaxial to the direction of the axis of the cylindrical bearing 34, of the bore 40), the annular portion 38 relative to the central portion 30.

The radial channels 46 open out into the area of the surface 34' of the cylindrical bearing 34 opposite the peripheral groove 62 housed in the area of the bore 40 of the annular portion.

Sealing means 64 are sandwiched between the central portion 30 and the annular portion 38, more precisely between the surface 34' of the cylindrical bearing 34 and the surface 40' of the bore 40, on both sides of the peripheral groove 62. According to an embodiment, these sealing means 64 are in the form of two O-rings which are housed in the form of channels provided on each side of the peripheral groove 62.

The conduit 42 of the annular portion 38 is arranged along a plane perpendicular to the longitudinal axis.

The outlet of the annular portion 38 is connected to the pipe 28.

Figure 1:
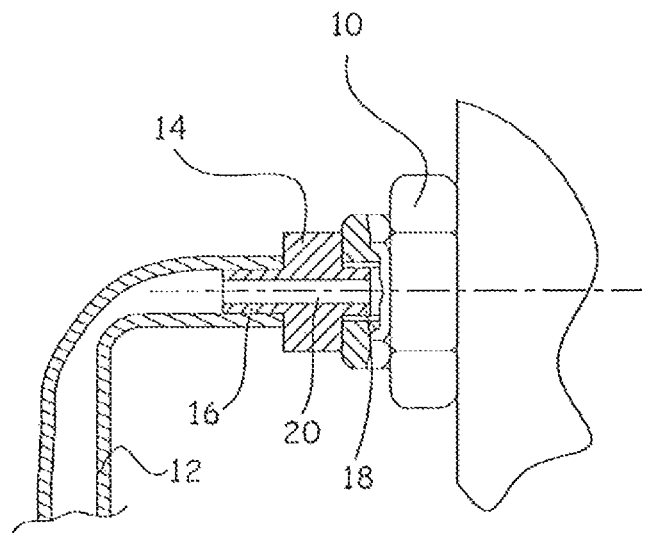
FIG. 1 is a cross-section of a connection device according to the prior art.
Figure 2:
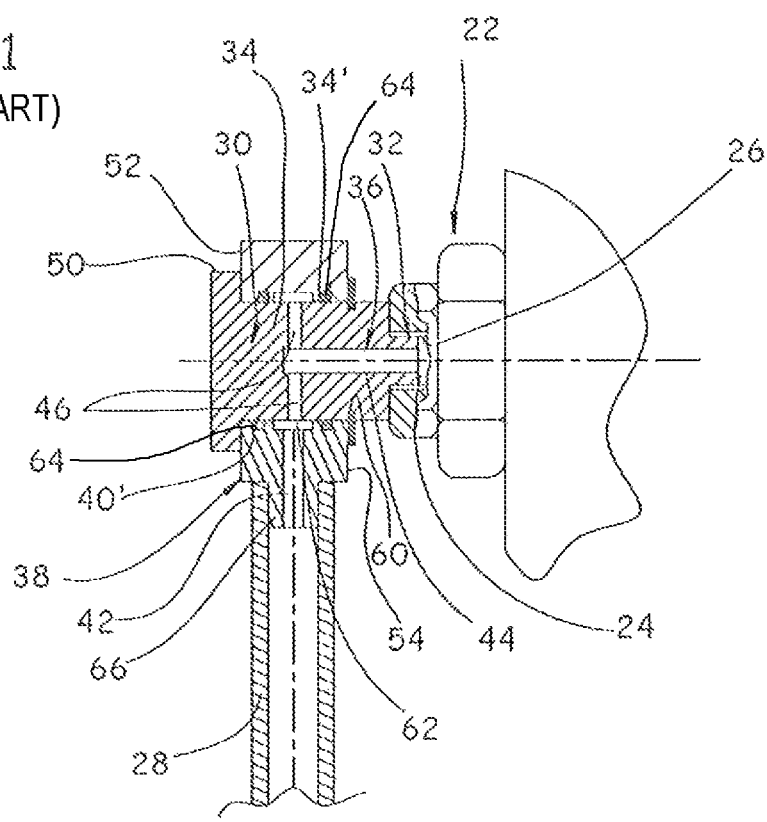
FIG. 2 is a cross-section of a connection device according to an embodiment of the invention.

According to an embodiment shown in FIG. 2, the annular portion 38 comprises, perpendicularly to the outlet, a tube 66, perpendicular to the longitudinal axis along the extension of the conduit 42 onto which the pipe 28 can be fitted.

Figure 3:
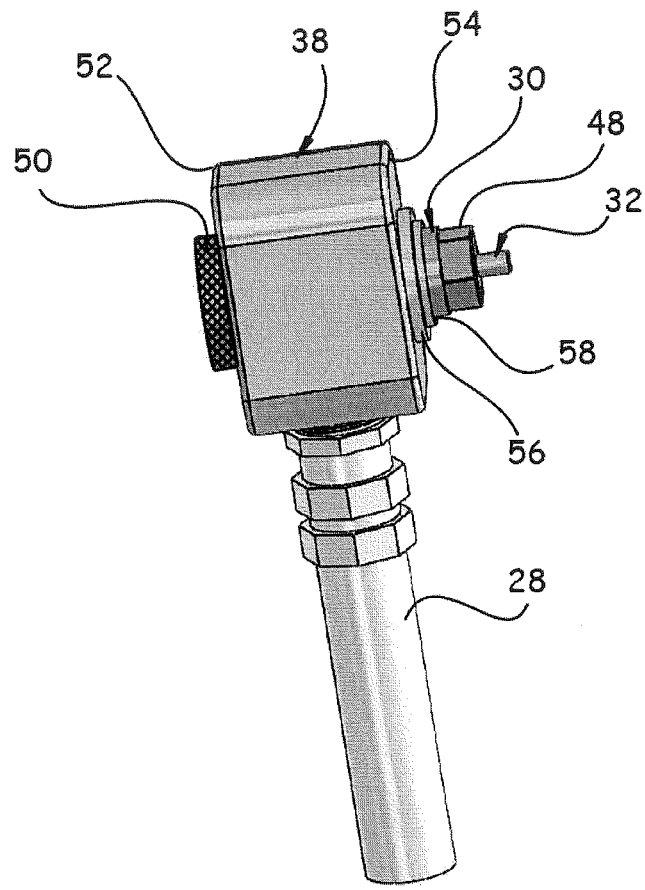
FIG. 3 is a lateral view of a connection device according to an embodiment of the invention.
Figure 6:
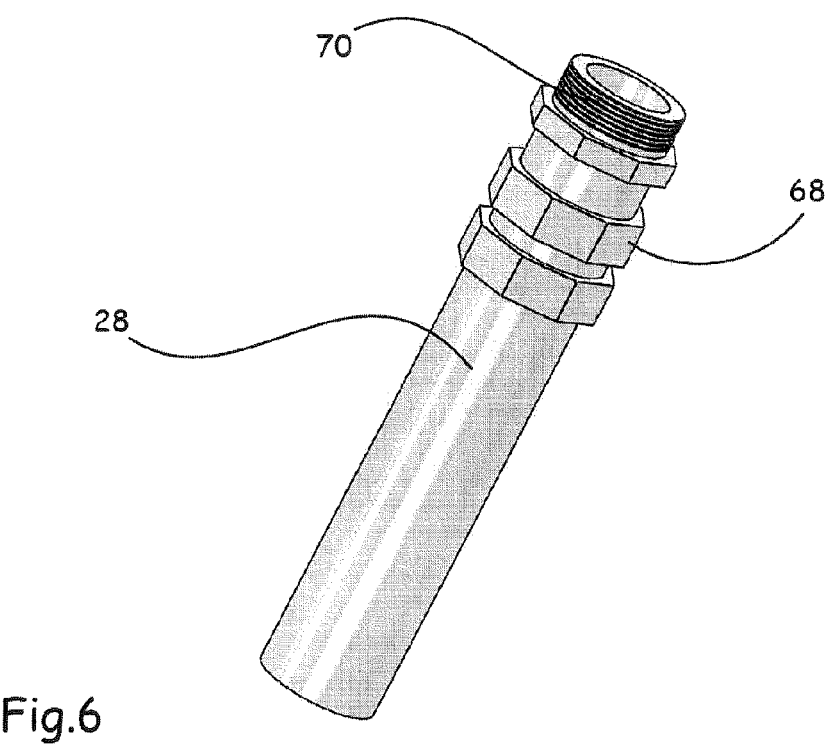
FIG. 6 is a perspective view of the end of a pipe.

According to an embodiment shown in FIGS. 3 and 6, the pipe 28 comprises a connector 68 with, at a first end, a cylindrical bearing onto which the pipe 28 is fitted and, at a second end, a threaded portion 70 capable of being screwed into a threading housed in the area of the open portion of the conduit 42.

Other solutions could be envisioned to ensure the pipe is connected to the connection device of the invention.

The invention claimed is:

1. A bleeding system comprising an open conduit and, upstream, a control allowing the hydraulic fluid to flow, or not, toward said open conduit, said control having a section configured to be maneuvered with a tool, said bleeding system comprising a dismountable connection device comprising:
    a connection adapted to be connected to the bleeding system;
    an outlet adapted to be connected to a pipe;
    a first central portion comprising said connection, a cylindrical bearing, and a first conduit extending between the connection and the outer surface of the cylindrical bearing;
    an annular second portion comprising a bore adapted to pivot on the cylindrical bearing, at least one second conduit connecting the outlet and the surface of the bore, at least one of the central portion and the annular portion comprising a groove ensuring the hydraulic fluid flows between the first and at least one second conduits,
    wherein the central portion of the connection device comprises a section to ensure the connection of said connection device to the bleeding system arranged between the connection and the cylindrical bearing,
    wherein the section of the central portion has the same shape as the section of the bleeding system control to ensure the connection of said connection device to the bleeding system by the same tool as that used for maneuvering the bleeding system control section, and
    wherein the section of the central portion abuts the section of the bleeding system control.

2. The bleeding system according to claim 1, wherein the section of the central portion has an hexagonal shape.

3. The bleeding system according to claim 1, wherein the central portion comprises a flange with a knurled periphery.

4. The bleeding system according to claim 1, wherein the first conduit comprises a first section coaxial to the cylindrical bearing, opening out in the area of the connection, and a plurality of radial channels extending from the coaxial section to the outer surface of the central portion, thereby extending between the connection and the outer surface of the central portion.

5. The bleeding system according to claim 1, wherein the annular portion comprises a threading disposed in the area of the open portion of the at least one second conduit to connect the pipe.

6. The bleeding system according to claim 5, further comprising the pipe connected to the connection device;
   wherein the pipe comprises a connector with, at a first end, a cylindrical bearing onto which the pipe is fitted and, at a second end, a threaded portion configured to be screwed into the threading disposed in the area of the open portion of the at least one second conduit.

7. The bleeding system according to claim 1, further comprising the pipe connected to the connection device.

* * * * *